F. A. DAWSON.

WINDOW SHADE ROLLER.

APPLICATION FILED MAY 7, 1917.

Reissued Oct. 9, 1917. 14,375.

Witness

Philip E. Barnes

Inventor

Franklin A. Dawson

By Vernon E. Hodges his Attorney

UNITED STATES PATENT OFFICE.

FRANKLIN A. DAWSON, OF COATS, NORTH CAROLINA, ASSIGNOR TO CUNNINGHAM SPRINGLESS SHADE COMPANY, A CORPORATION OF NORTH CAROLINA.

WINDOW-SHADE ROLLER.

14,375. Specification of Reissued Letters Patent. Reissued Oct. 9, 1917.

Original No. 1,181,852, dated May 2, 1916, Serial No. 77,031, filed February 3, 1916. Application for reissue filed May 7, 1917. Serial No. 167,137.

*To all whom it may concern:*

Be it known that I, FRANKLIN A. DAWSON, a citizen of the United States, residing at Coats, in the county of Harnett and State of North Carolina, have invented certain new and useful Improvements in Window-Shade Rollers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in shade and curtain fixtures, and it has for its object, among others, the provision of a bracket adapted to be secured directly to a casing or window frame, the bracket being constructed of a single piece of sheet metal so fashioned as to provide a suitable bearing for the roller pintles and affording, in addition, means whereby the curtain cord used in raising the curtain is passed through a suitable guide above the roller and so positioned with reference thereto as to avoid contact of the cord with the roller.

The invention relates particularly to that class of devices in which the use of a spring is obviated and in which provision is had for locking the curtain at any desired height.

The invention has for a further object the provision of a curtain fixture of the character mentioned in which a single operating cord suffices for operating the device, thus simplifying the construction, in which two cords are required.

The invention has for a further object the use of novel means for unlocking the roller from the bracket and permitting its being rotated in either direction, either to rise or lower, the use of the usual contained spring being omitted and the construction being such as to permit the roller to fall into its locked position at once upon the release of the rotating means.

To these ends and to such others as the invention may pertain, the same consists in the novel construction and in the peculiar arrangement, combination and adaptation of parts, all as will be more fully hereinafter described, shown in the accompanying drawings and then specifically defined in the appended claims.

The invention also consists in a curtain shade roller adapted to have a curtain-shade attached thereto in the usual manner, and wound therearound, whereby the weight of the curtain-shade tends to turn the roller in one direction, pintles at the ends of the roller, and brackets having orifices therein to act as bearings for the pintles, one pintle having a non-cylindric portion, and the orifice in one bracket of a shape permitting the non-cylindric portion of the pintle to turn when in one part thereof, and acting to lock the pintle and roller against turning when in another part thereof, due to the weight of the curtain-shade turning the roller backward when this tendency is unresisted, and flexible means secured to and wound around the roller in a direction reverse that of the curtain-shade, and thence extending through a guide adjacent to the curtain-shade roller, which flexible means, when pulled, lifts the pintle into the portion of the bearing orifice in which it is capable of turning, and thence, by a further pull thereon, causes the winding of the curtain-shade upon the roller, whereas a release of the flexible means permits the pintle to automatically roll into the portion of the slot which locks it against turning.

The invention is clearly illustrated in the accompanying drawings which, with the numerals of reference marked thereon, form a part of this specification and in which.

Figure 1:
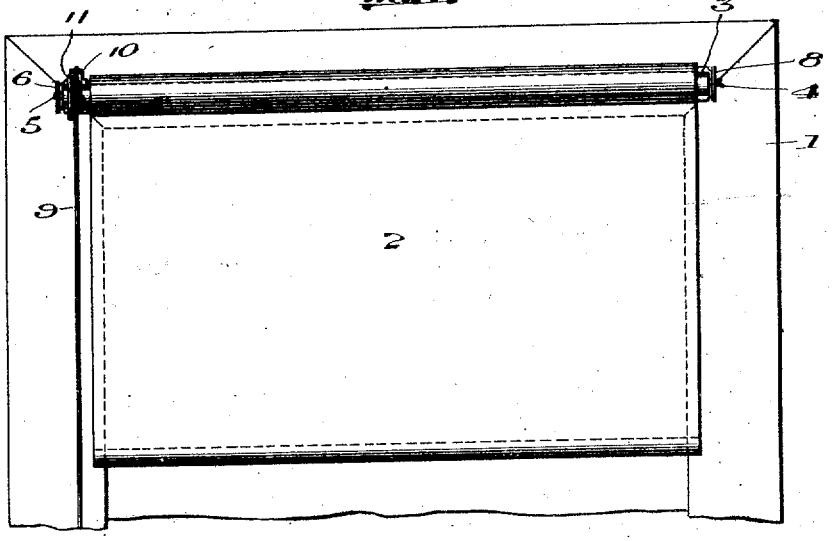
Figure 1 is a front view of the upper portion of a window with my improved curtain fixture in place therein.
Figure 2:
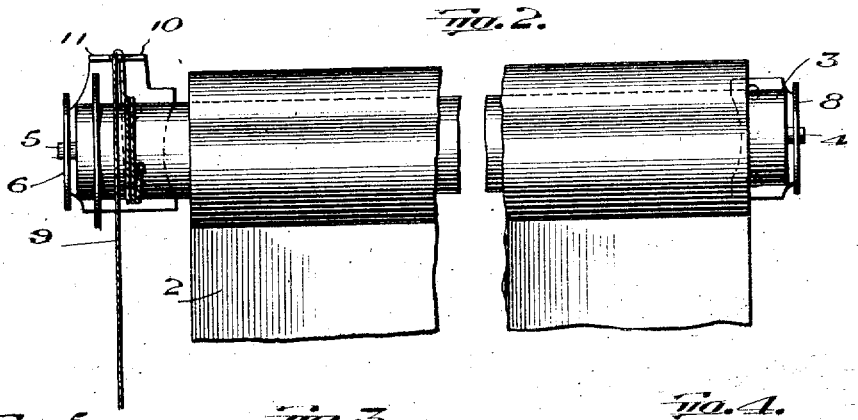
Fig. 2 is a like view of the upper portion of a window with my improved curtain fixture in place therein.
Figure 5:
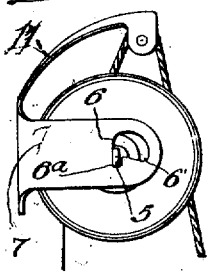
Fig. 5 is a view in side elevation, of the supporting bracket 7.
Figure 3:
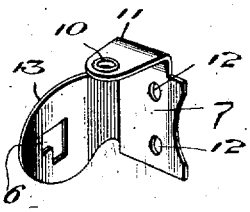
Figs. 3 and 4 are enlarged details in perspective of the curtain brackets used at opposite ends of the curtain.
Figure 4:
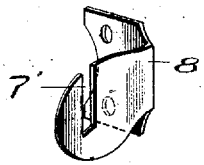

Reference now being had to the details of the drawings by numeral, 1 represents a window frame or casing, and 3 is a curtain roller upon which is mounted a shade 2 in the usual manner. Projecting from the opposite ends of the roller 3 are pintles 4 and 5 mounted to rotate in the angular opening 6 in the bracket 7 at one end of the roller and the vertically disposed slot 7′ in the bracket 8 at the opposite end of the roller.

It will be noted that, in mounting the roller, a space is provided between the end of the roller adjacent to the bracket 7 for the reception of the cord 9, one end of which cord is secured to the roller and, after being secured to and wound about the roller, is passed upward through an eyelet or cord guide 10 in the forwardly extended end of the horizontal extension 11 of the bracket 7.

The brackets are provided with perforations or openings 12, 12, for the reception of screws used in securing them to the window casing. It will be noted that the main portion of the opening 6 in the forwardly extended bracket supporting portion 13 is rectangular and from which is a portion extending downwardly.

From the foregoing description of the construction of the device, its operation will be readily understood. It will be noted that the formation of the bracket 7 is such as to provide in a single element provision for journaling an end of the roller and also for the passage of the curtain cord through a forwardly extended portion of the bracket above and in advance of the roller, thus dispensing entirely with an additional roller support or extra roller commonly employed in connection with curtain fixtures of this character. It will also be noted that the formation of the pintle opening 6 is such as to permit the curtain to be rotated readily and yet locked automatically at any point desired.

The end 6′ of the pintle aperture forms a pocket which supports the pintle 5 when the curtain is turned in either direction and this is accomplished by the operator manipulating the single cord 9, the first pull on the cord having the effect of lifting the pintle from its locked position in the lower end 6ª of the opening 6, into the pocket 6′ where it is capable of rotating in one direction or the other accordingly as the cord 9 is pulled down or allowed to move in the direction so long as it is kept taut, the pintle relocking when the cord is released or slackened permitting the pintle by gravity to roll over into the lower end 6ª of the opening 6, when it locks.

I claim:

1. The combination with a curtain shade roller having pintles at each end, one of which has at least a portion non-cylindric, and a single cord wound from one end around the curtain-shade roller, of brackets having orifices therein to receive the pintles, one of said orifices formed with a pintle locking end and also a lateral pocket, and the cord so directed in its passage from the roller, that a certain degree of tension applied thereto will pull the non-cylindric pintle into the pocket of the orifice, where it is capable of turning, and a slight slackening of the cord will permit the roller to turn in a reverse direction, and additional slackening or release of the cord will allow the non-cylindric pintle to enter the lower end of the orifice which thereby locks the pintle.

2. The combination with a window-shade roller having pintles at each end, one of which has a non-cylindric portion, brackets having orifices to receive and serve as bearings for said pintles, one of said orifices having a pocket formation in which the non-cylindric bearing will turn, and another portion for locking said bearing against turning when resting therein, of a curtain-shade wound around the roller in one direction, and a flexible device wound around the roller in the opposite direction, and a guide adjacent to the roller through which the flexible device extends from the roller, said flexible connection adapted to be pulled or released accordingly as the roller is to be turned or locked, the release of the flexible device permitting the non-cylindric portion of the pintle to drop into the portion of the orifice which locks the pintle against turning, and the flexible device also acting to lift the pintle from the locking portion of the orifice to the pocket wherein it turns when tension is applied thereto.

3. A curtain shade roller having a curtain shade thereon, and adapted to be turned in one direction by the weight of the curtain shade, and having a cord wound therearound in an opposite direction, which operates to turn the roller in an opposite direction from that due to the weight of the curtain shade, when tension is applied thereto, in connection with a non-cylindric pintle, and a bracket having an orifice therein, one part of which forms a pocket which permits the pintle to turn, and the other part of which acts as a locking means, and means through which the cord extends on its way from the roller, adapted to cause the non-cylindric portion of the pintle to be lifted and held, when tension is applied to the cord, in the pocket portion of the orifice in which it may turn, when the curtain shade is either raised or lowered.

4. A curtain shade roller having a non-cylindric pintle in one end, a bracket having an angular orifice to receive and lock the pintle, said orifice having a lateral pocket which provides a supporting shoulder on which said pintle may revolve, and a cord wound around the roller and extending through a support thereabove adapted when tension is applied thereto to lift said pintle into said socket to allow it to revolve on the supporting shoulder, the revolution of the pintle in the pocket in one direction tending to roll the pintle over into the lower end of the orifice to lock it against rotation.

5. A bracket for shade fixtures formed of a metallic plate having openings to receive its securing means and formed with a forwardly extended portion with vertical opening with straight sides and a straight-sided lateral opening leading therefrom, a horizontal extension from the top of the body of said bracket extending forward and adapted to guide a single cord, said cord being adapted to be connected with and to wind upon a shade roller, whereby, when the cord is pulled upon, the flattened pintle of the shade roller, which normally rests in the vertical portion of said opening, is raised and moved forward out of alinement with said vertical opening and into the lateral opening and revoluble therein, and automatically returnable to the vertical opening when pressure on said cord is released.

In testimony whereof, I have signed my name to this specification in the presence of two subscribing witnesses.

FRANKLIN A. DAWSON.

Witnesses:

J. A. JOHNSON,

JAMES T. MOREHEAD, Jr.